United States Patent [19]

Legler et al.

[11] Patent Number: 5,065,652
[45] Date of Patent: Nov. 19, 1991

[54] SCROLL SAW

[75] Inventors: John G. Legler, Huber Heights; Robert L. Bartlett, Dayton; David D. Flora, Arcanum, all of Ohio

[73] Assignee: Shopsmith, Inc., Dayton, Ohio

[21] Appl. No.: 625,508

[22] Filed: Dec. 11, 1990

Related U.S. Application Data

[60] Division of Ser. No. 471,015, Jan. 22, 1990, abandoned, which is a continuation of Ser. No. 226,172, Jul. 29, 1988, abandoned.

[51] Int. Cl.$^5$ .............................................. B23D 41/00
[52] U.S. Cl. ........................................ 83/168; 83/169; 83/662; 83/748; 83/783; 83/814
[58] Field of Search ................ 83/98, 169, 814, 782, 83/783, 784, 786, 662, 748, 168, DIG. 1

[56] References Cited

U.S. PATENT DOCUMENTS

| | | |
|---|---|---|
| Re. 32,020 | 11/1985 | Abel . |
| 15,790 | 9/1856 | Wood et al. . |
| 882,044 | 3/1908 | Anderson ........................ 83/786 |
| 1,258,695 | 3/1918 | Miller et al. ...................... 83/814 |
| 1,852,193 | 4/1932 | Schneider ........................ 83/783 |
| 1,877,705 | 9/1932 | Tautz ................................ 83/784 |
| 2,033,846 | 3/1936 | Mitchell . |
| 2,107,174 | 2/1938 | Boice . |
| 2,216,828 | 10/1940 | Paque . |
| 2,327,239 | 9/1943 | Bartlett . |
| 2,635,651 | 4/1953 | Hulfish . |
| 2,646,089 | 7/1953 | Gaskell ........................... 83/784 |
| 2,692,622 | 10/1954 | Heese . |
| 2,721,586 | 10/1955 | Hill . |
| 2,775,272 | 12/1956 | Papworth . |
| 2,780,249 | 2/1957 | Andreae et al. . |
| 2,927,612 | 3/1960 | Edgemond, Jr. et al. . |
| 3,131,736 | 5/1964 | Ristow et al. . |
| 4,503,742 | 3/1985 | Sutton . |
| 4,616,541 | 10/1986 | Eccardt et al. .................. 83/782 |
| 4,619,171 | 10/1986 | Miller ............................... 83/782 |
| 4,625,609 | 12/1986 | Ashworth . |
| 4,674,381 | 6/1987 | Cadorin ............................ 83/786 |
| 4,681,006 | 7/1987 | Miller . |

Primary Examiner—Frank T. Yost
Assistant Examiner—Scott A. Smith
Attorney, Agent, or Firm—Biebel & French

[57] ABSTRACT

A scroll saw has a base including integral walls forming a gear casing, a frame assembly mounted on the base, and lower and upper oscillating arm members pivotally mounted on the frame assembly. The gear casing houses gear and counterweight assemblies for driving and counterbalancing the oscillating motion of the lower and upper arm members. A saw blade is removably mounted between corresponding free ends of the lower and upper reciprocating arm members. The ends of the saw blade are prepositioned between a pair of blade holders, and the entire assembly of blade and blade holders is then attached as a unit to the free ends of the arm members. Blade tension is adjusted by means of a tensioning system that indexes blade tension to rotation of a tension knob. The saw further includes a nonflexible tube which functions as a combination airblaster and blade guard for directing an air stream into a cutting area to remove sawdust and other debris while preventing accidental contact with the saw blade.

8 Claims, 6 Drawing Sheets

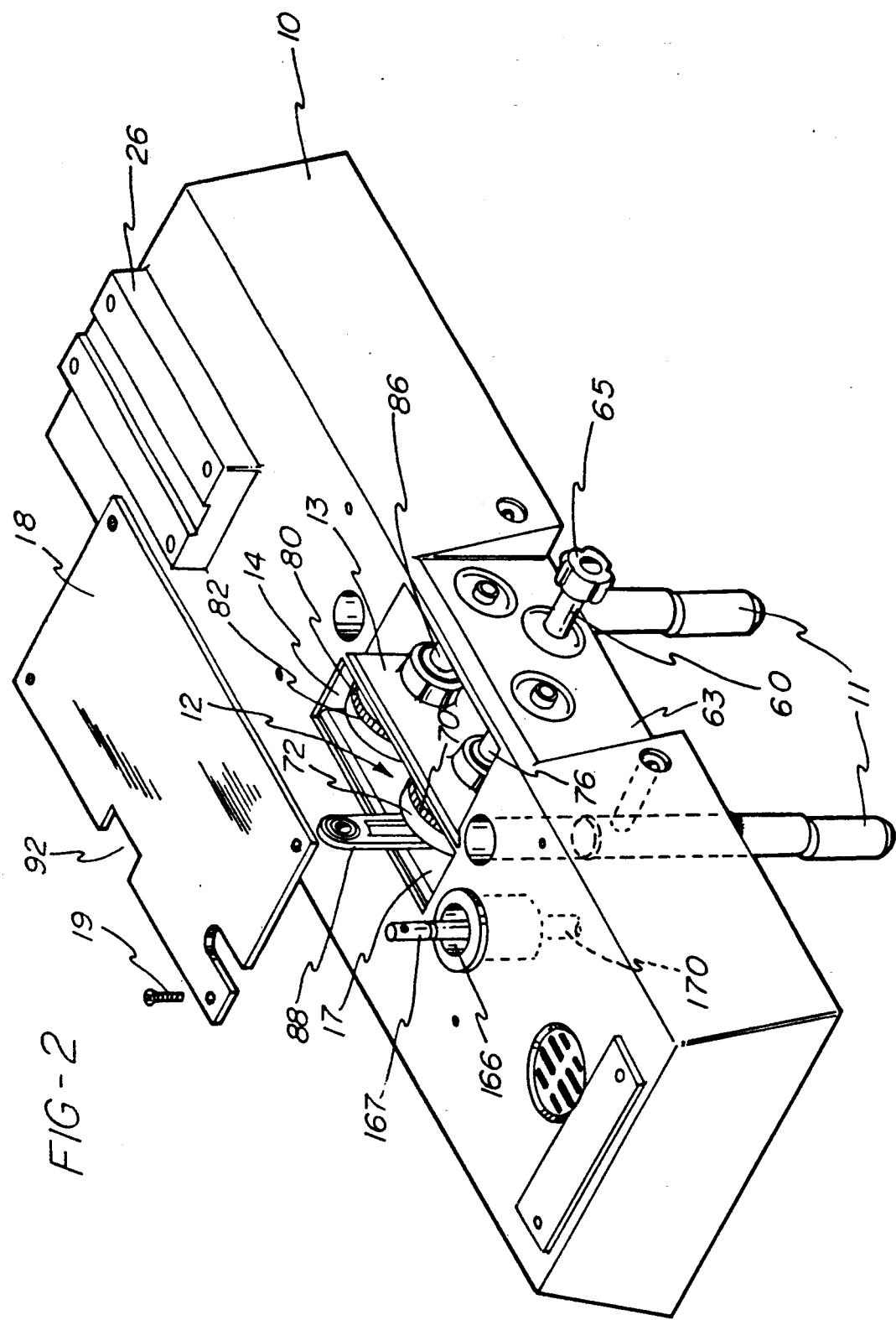

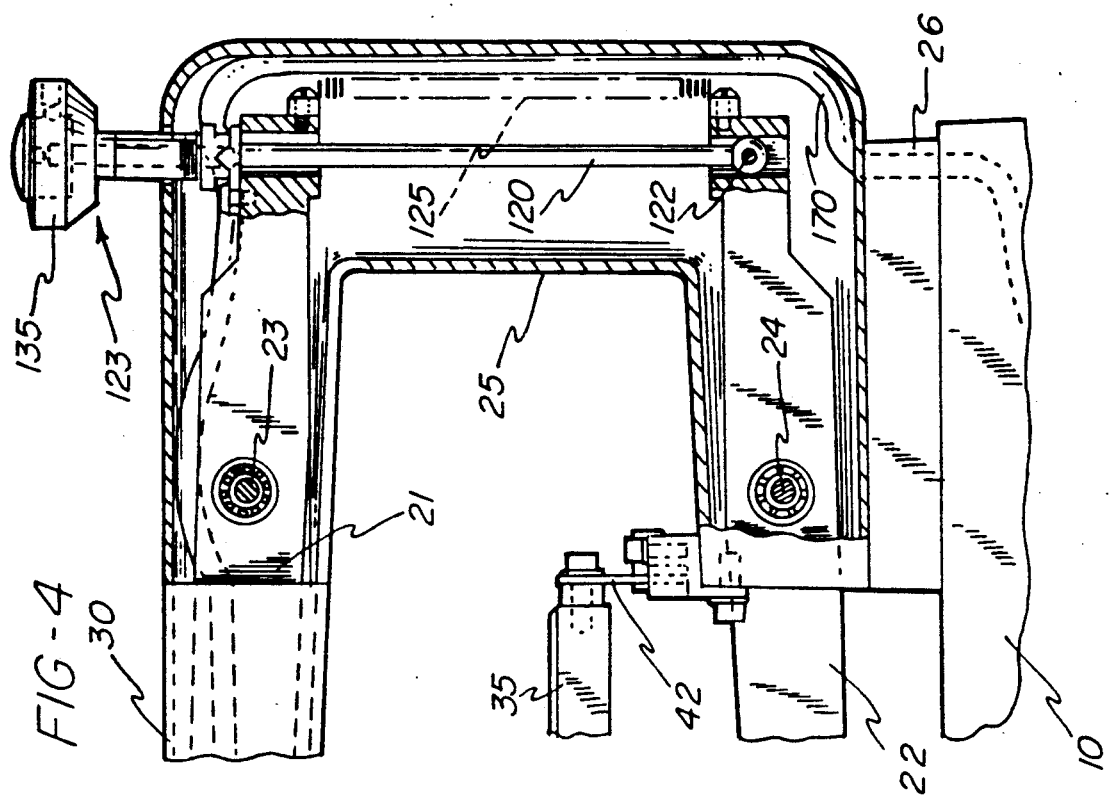
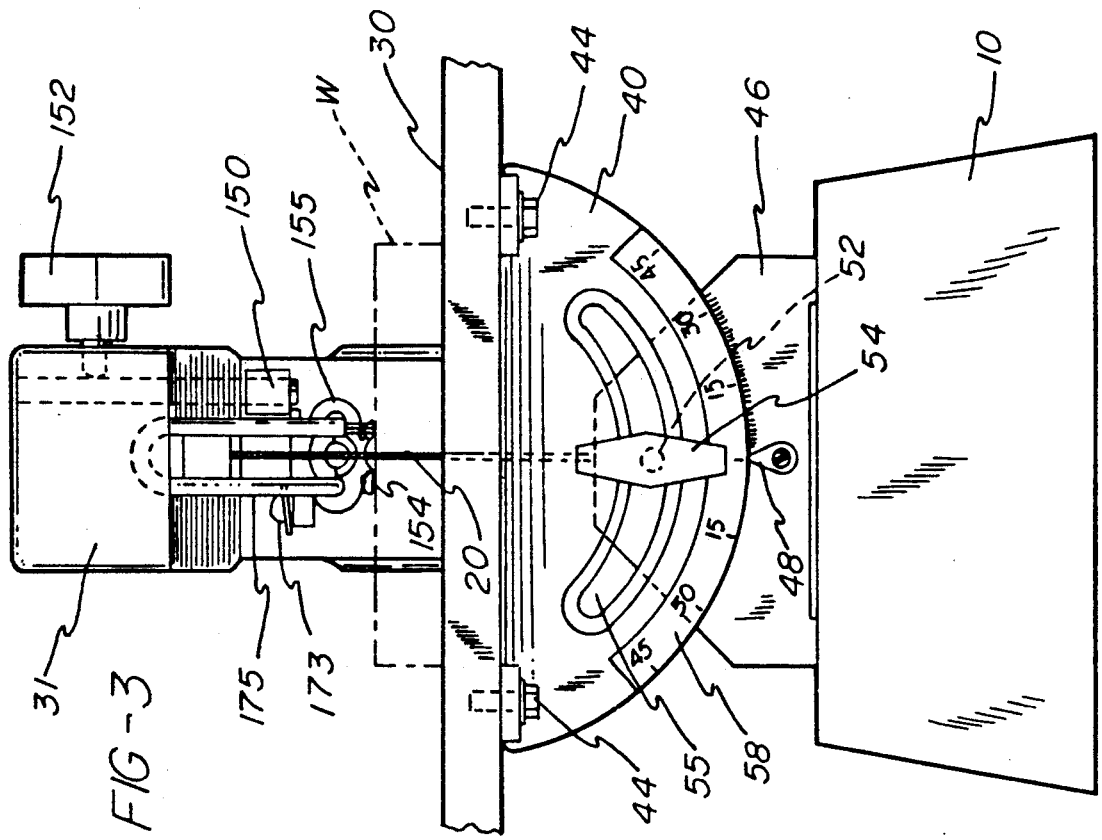

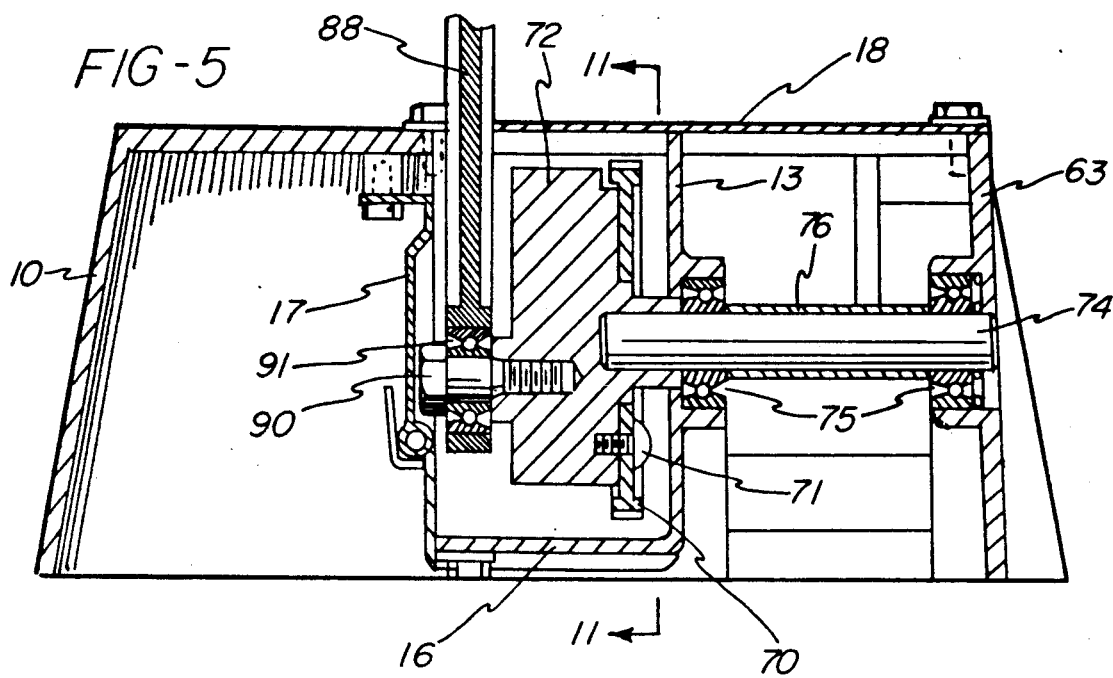
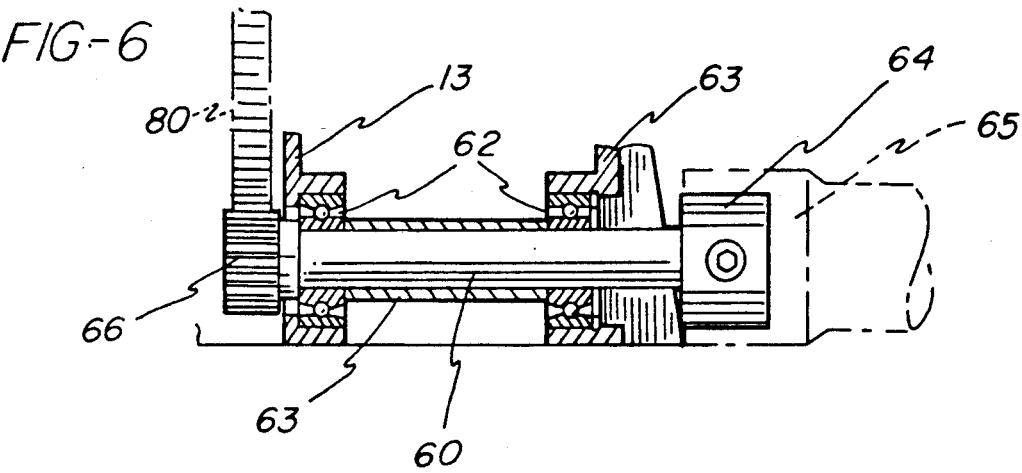
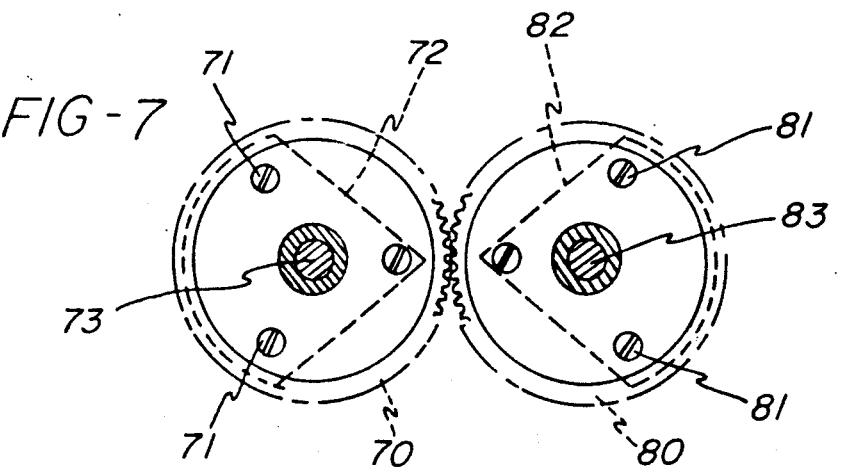

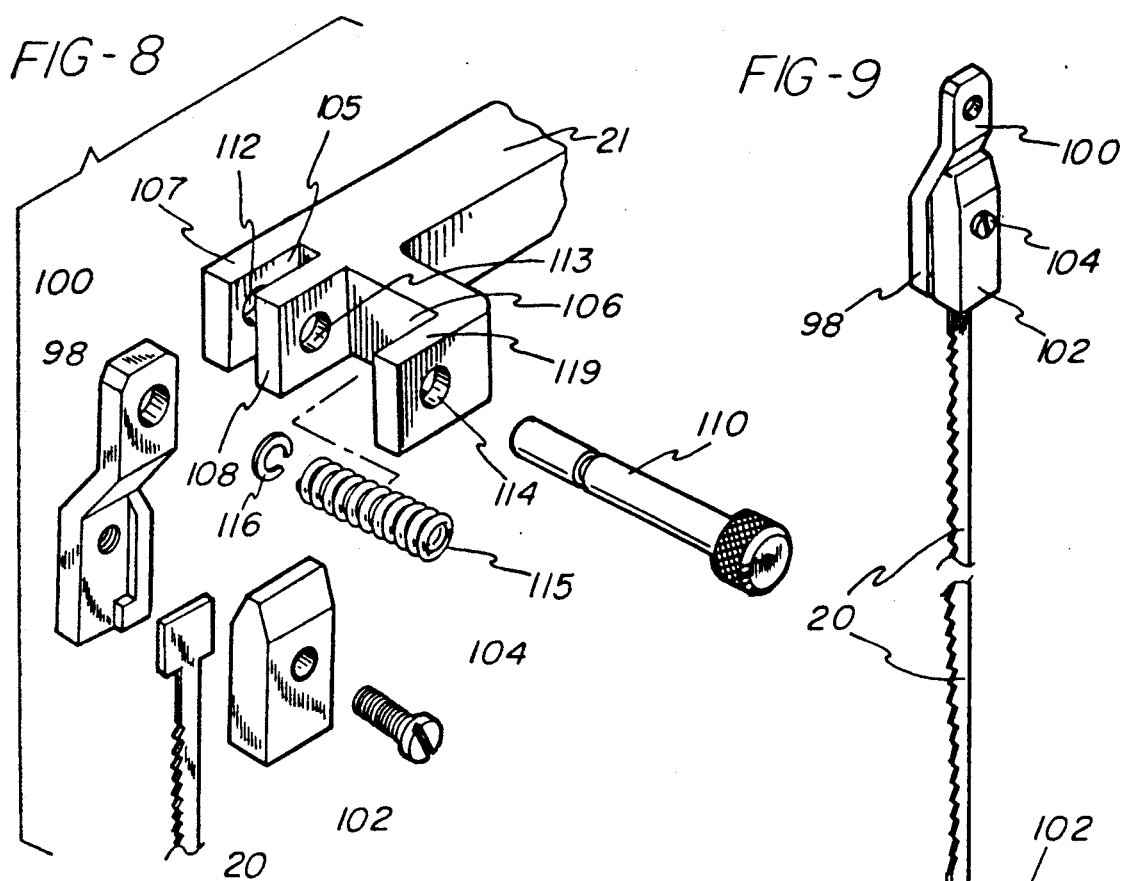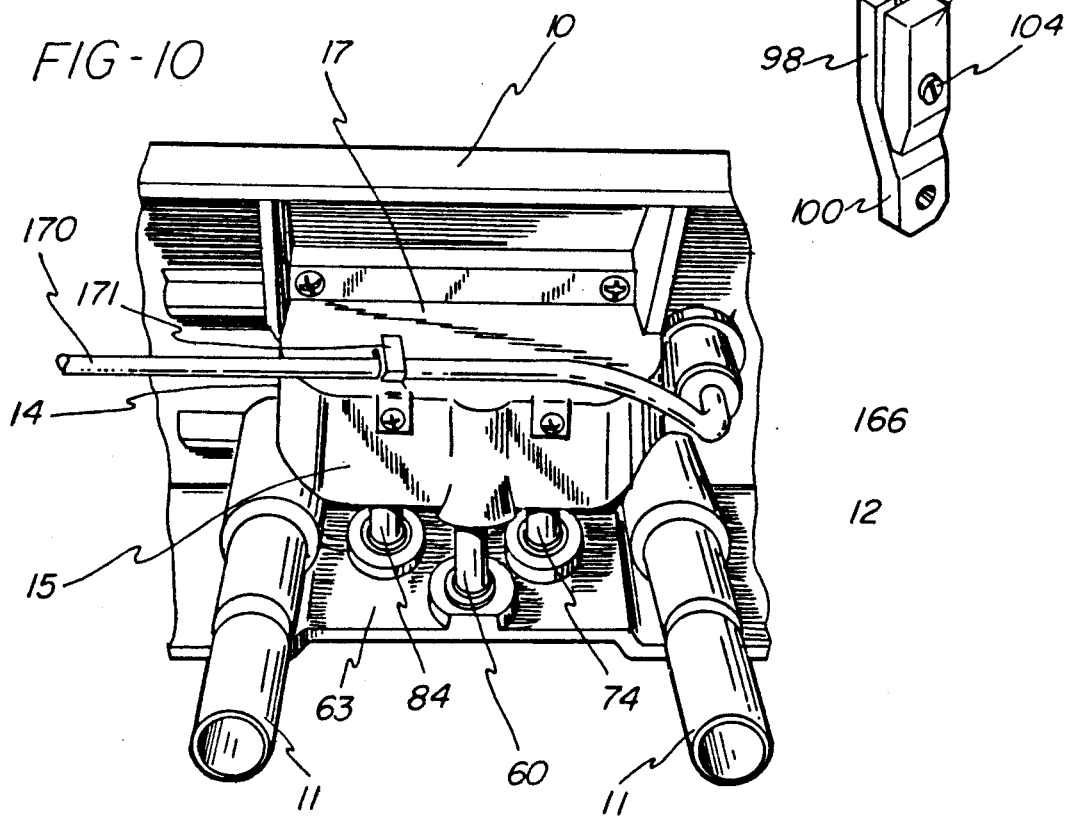

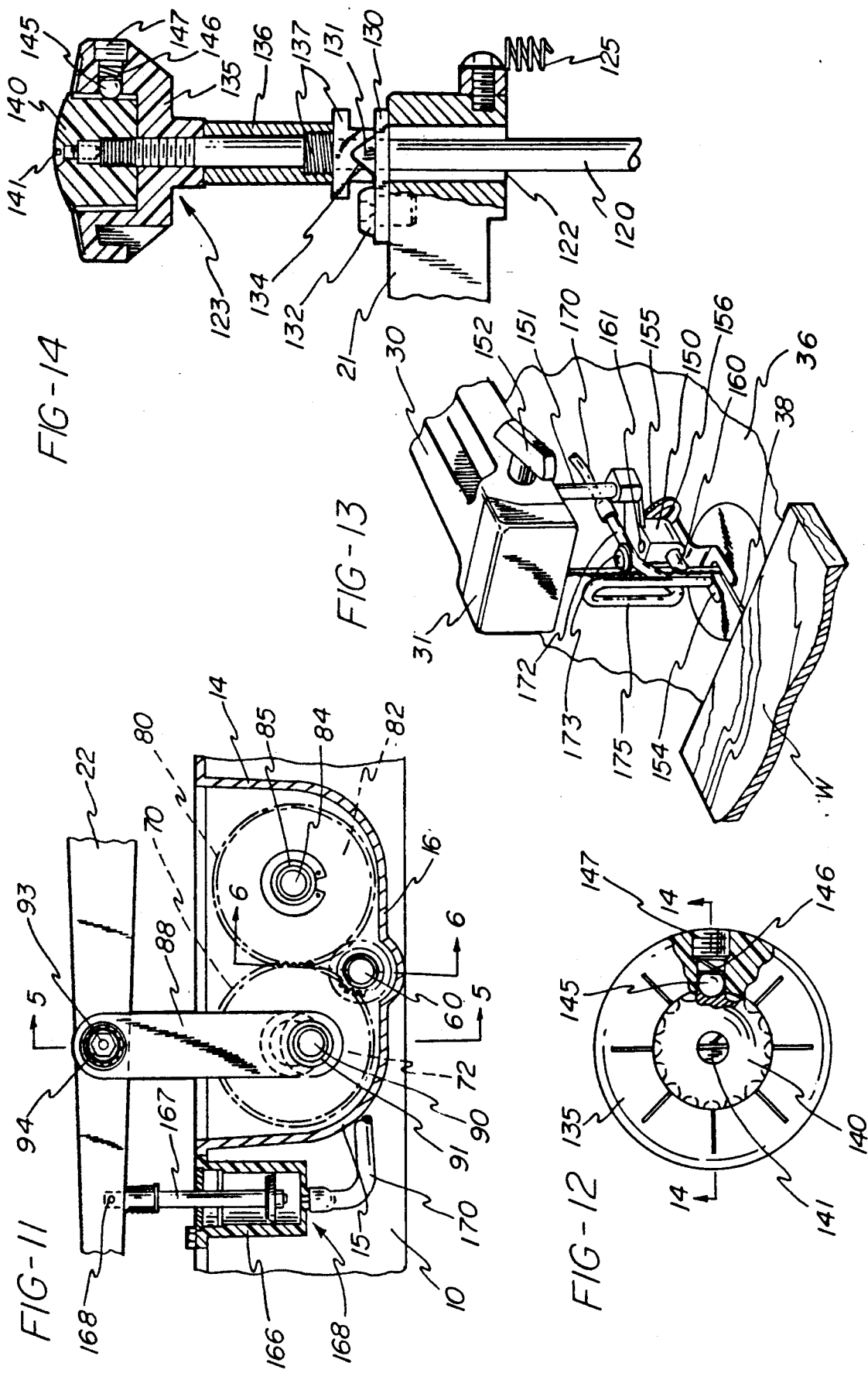

SCROLL SAW

This is a division of application Ser. No. 471,015, filed Jan. 22, 1990 now abandoned, which is a continuation of Ser. No. 226,172, filed July 29, 1988, now abandoned.

BACKGROUND OF THE INVENTION

This invention relates to power tools, and more particularly, to improved scroll saws or jig saws wherein a saw blade is connected between the free ends of a pair of arm members, which are oscillated in unison about their respective pivot points at high speed to cause reciprocating movement of the saw blade.

Such rapid oscillated of the arm members creates large inertial forces, which can result in severe vibration of the entire saw assembly unless it is bolted or otherwise secured by a large mass. To offset these inertial forces, it is known to provide a counterbalancing assembly mounted in a separate housing which is bolted or otherwise attached to a portion of the saw, such as its base. Additionally, the saw blade must be accurately positioned and placed under the correct amount of tension for successful operation. Many prior art devices include relatively complicated blade mounting and tensioning mechanisms, rendering accurate positioning and tensioning of the blade a tedious and difficult procedure.

In order to remove saw dust and other debris resulting from the sawing operation, it is conventional to provide a system for delivering an air stream to the cutting area. Furthermore, in order to protect the user from accidental contact with the blade, a saw is usually provided with some sort of guard. However, where provision is made in prior art devices for removal of saw dust and the like and/or a guard against inadvertent contact with the blade, separate saw guards and airblast assemblies are utilized, thereby increasing the cost and the complexity of the saw.

It will be apparent, therefore, that despite long-standing use of scroll saws, it is conventional to utilize separate gear and counterweight casings, blade positioning and tensioning mechanisms that are both tedious and difficult to adjust properly and, where provided at all, separate systems for removing saw dust and other debris from the cutting area and guarding against inadvertent contact with the saw blade.

SUMMARY OF THE INVENTION

In accordance with the present inventions a scroll saw is provided that obviates the disadvantages and difficulties associated with prior art saws of this type by incorporating a gear and counterweight casing as an integral part of the saw base, by providing a simplified and error-free system for both positioning and tensioning the saw blade, and by combining in a single unit a saw dust remover and a blade guard.

Thus, in accordance with the present invention a scroll saw is provided comprising a base having an integrally formed gear casing, a frame assembly mounted on the base, lower and upper oscillating arm members pivotally mounted to the frame assembly and each having a free end with first and second recesses. The gear casing houses gear and weight assemblies for counterbalancing the oscillating motion of the lower and upper arm members.

The saw blade includes first and second ends removably mounted between corresponding free ends of the lower and upper oscillating arm members. The first and second blade ends are each securely clamped between a respective blade holder having a longitudinally extending flange portion, and a blade clamp. The first recess of each arm member is adapted to receive the flange portion of the corresponding blade holder. A lock pin is inserted through holes in the first and second recesses and the flange portion to secure the blade to the arm members.

The saw further comprises a blade tension knob having clicker means, a rocker assembly having an upper rocker and a lower rocker, and a tensioning rod threaded into the knob and pivotally mounted to the lower arm member. In operation, rotational movement of the blade tension knob varies the tension on the tensioning rod, causing the ends of the lower and upper arm members opposite the ends to which the blade is attached to pivot toward or away from each other and thereby to vary tension in the blade.

Furthermore, an air pump is mounted in the base for supplying an air stream to the cutting area. Flexible tubing attached to the air pump directs the air stream to a nonflexible tube extending in front of the cutting edge of the blade for directing the air stream into the cutting area and preventing accidental contact with the saw blade.

The primary objects of this invention, therefore, are to provide a scroll saw having an integrally formed base and gear casing, a simplified and highly accurate blade mounting and tensioning means, and a combination sawdust removal and blade guard system.

Other objects and advantages of the invention will be apparent from the following description, the accompanying drawings and the appended claims.

BRIEF DESCRIPTION OF THE DRAWINGS

FIG. 2 is a perspective, exploded view showing the base with an integrally formed gear casing;

FIG. 3 is a front elevational view showing the tilt indicator, gage means, and the workpiece holddown assembly;

FIG. 4 is a fragment of FIG. 1 broken away to show the blade tensioning system;

FIG. 5 is a section on the line 5—5 in FIG. 11;

FIG. 6 is a fragmentary section on the line 6—6 in FIG. 11;

FIG. 7 is a cross-sectional view taken on line 7—7 of FIG. 5 and showing a portion of the gear and weight assemblies;

FIG. 8 is a perspective, exploded view showing a blade holder assembly and an arm member having first and second recesses;

FIG. 9 is a perspective view of a blade having both ends mounted in respective blade holders;

FIG. 10 is a perspective bottom view showing a portion of the base with the integrally formed gear casing;

FIG. 11 is a partial section on the line 11—11 in FIG. 5 with certain parts on the near side of the section line shown in phantom;

FIG. 12 is a top plan view of the blade tension knob showing the clicker means with the knob partially broken away;

FIG. 13 is a perspective view of a front portion of the scroll saw showing the combination airblast pipe and guard means; and FIG. 14 is a partial section on the line 14—14 in FIG. 12.

DESCRIPTION OF THE PREFERRED EMBODIMENTS

Figure 1:
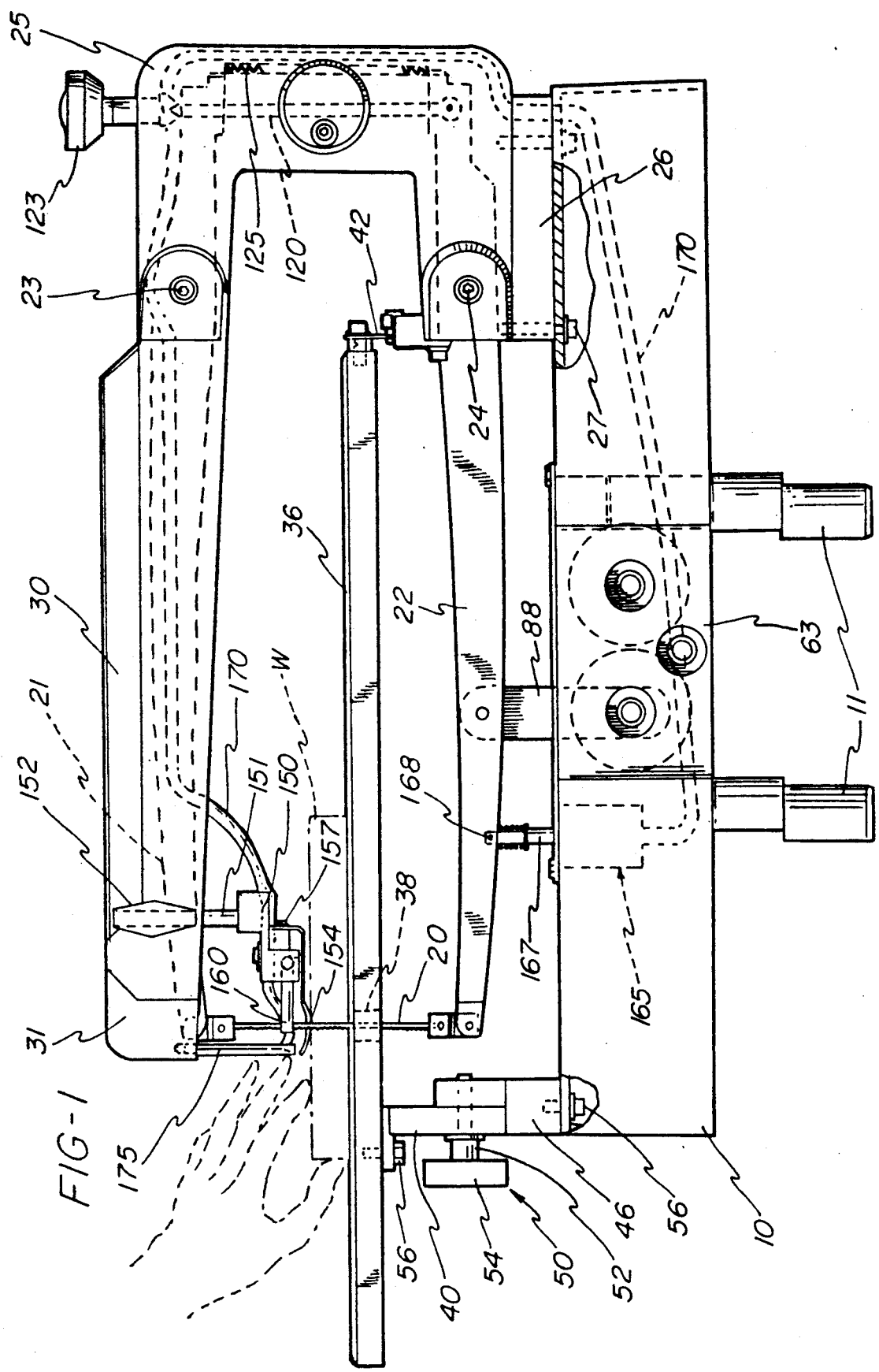
FIG. 1 is a side elevational view of a preferred embodiment of the scroll saw of the present invention.

While the following description will be confined to that embodiment of the invention intended for use with a multi-purpose tool of the type shown in U.S. Pat. No. 2,927,612, it will be apparent that the specific manner of powering the scroll saw of the present invention does not, per se, constitute part of the invention. Thus, rather than using the power take-off from a multi-purpose tool, the scroll saw could, within the scope of the present invention, incorporate its own power source in the form of a motor or the like.

Referring to the drawings, the saw base 10 is provided with supporting tubes 11 for mounting on the multipurpose working tool of the type shown and described in U.S. Pat. No. 2,927,612. The base 10 includes integral wall portions which cooperate to form a gear casing generally designated 12 which houses all of the drive gears for the saw as further described hereinafter. More specifically, these wall portions comprise a side wall 13, end walls 14 and 15 and a bottom wall 16. The side of the chamber 12 opposite the side wall 13 is closed by a removable cover 17, and the top of the casing 12 is provided with a removable cover plate 18 secured on the top of base 10 by screws 19.

The saw blade 20 is supported by the forward ends of upper and lower oscillating arms 21 and 22 which have pivotal mountings 23 and 24 in a frame 25 mounted by means of a block 26 and screws 27 on top of the rearward end of base 10. Upper arm cover assembly 30 extends forwardly from the frame 25, and a hood 31 is pivotally mounted on the forward end of cover assembly 30 to provide access to the upper end of the blade 20 as described hereinafter.

A table 36 for supporting a workpiece W is provided with an opening 38 for blade 20 and is adjustably mounted on front and back trunnions 40 and 42. Back trunnion 42 is mounted on frame assembly 25, and as shown in FIGS. 1 and 3, mounted to the top surface of base 10 by bolts 44 or other similar means, is a trunnion support 46, which supports the front trunnion 40 and is provided with a table tilt indicator 48 (see FIG. 3). A trunnion lock 50 comprising a threaded shank 52 and a knob 54, extends through an arcuate slot 55 front trunnion 40 and into trunnion support 46. Table 36 is attached to front trunnion 40 by bolts 56. As illustrated in FIG. 3, trunnion support 46 and tilt indicator 48 cooperate with scale means 58 for determining the angle of table 36 relative to base 14.

As previously noted, all of the gears and associated parts for driving the saw are housed in the gear casing 12 which is formed as an integral part of the base 10, thereby simultaneously reducing the complexity, cost and weight of the gearing system while improving its stability. Thus referring to FIGS. 2 and 5-7, the drive shaft 60 is mounted by bearings 61 and a spacer sleeve 62 in a recess portion 63 of the outer side wall of base 10 and in the side wall 13 of the gear casing 12, with its inner end extending into the gear casing 12. Drive shaft 60 has a hub 64 on its outer end for mating with a multipurpose woodworking tool power take-off 65 (shown in phantom in FIG. 6), or with any other suitable drive source.

A drive pinion 66 on the inner end of shaft 60 meshes with a gear 70 secured by bolts 71 to a counterweight 72 mounted in gear chamber 12 on the end of a shaft 73 which is supported by bearings 74 and a spacer sleeve 75 in the outer side wall of base 10 and in the side wall 13 of gear casing 12. The gear 70 also meshes with a gear 80 of the same size which is attached by means of bolts 81 to a second counterweight 82 mounted in gear casing 12 on the nd of a shaft 84 which is rotatably supported by bearings 85 and a spacer sleeve 86 in the gear casing wall 13 and the side wall of base 10.

The gearing in casing 12 is provided with a driving connection to the lower blade-carrying arm 22 by a link 88 which has its lower end attached to the counterweight 72 by a bolt 90 threaded into an eccentrically located bore in counterweight 72 and having an unthreaded section journalled in the bearing 91 in link 88. The link 88 passes through an opening 92 in the gear casing cover plate 18, and its upper end is connected by a bolt 93 and bearing 94 to the lower saw blade arm 22.

In operation, the rotational movement of counterweight 72 is transformed through link 88 into oscillating movement of arms 21 and 22 about their respective pivotal mountings 23 and 24 in frame 25 and corresponding reciprocating movement of the saw blade 20. In addition, since each of the counterweights 72 and 82 is shaped generally as a sector of a circle having a center of gravity offset radially from the axis of the associated gear 70 or 80, and since they rotate in opposite directions from their reference positions shown in FIG. 7, they cancel out the inertial effects of the oscillating arms and of each other.

The saw blade 20 is attached to the free ends of both lower and upper arm members 22 and 21. As shown in FIGS. 8 and 9, blade 20 is prepositioned and frictionally secured at both ends, prior to being attached to arm members 21 and 22, between a blade holder 98 having a longitudinally extending flange portion 100 and a blade clamp 102 by a button head screw 104 or other similar means. In this way, blade 20 can be accurately and easily positioned relative to the blade holders 98 prior to being mounted on the scroll saw.

The free end of each arm member 21 and 22 is provided with first and second recesses 105 and 106, defined by outwardly projecting ears 107, 108 and 109, respectively. Recess 105 is adapted to receive flange portion 100 of blade holder 98. A lock pin 110 is inserted through holes 112, 113 and 114 in ears 107, 108 and 109, respectively, and also through flange portion 100, to secure both ends of the blade 20 to arm members 24 and 22. As illustrated in FIG. 8, recess 106 is provided with a compression spring 115, mounted concentrically about lock pin 110 and held in position by a retaining ring 116, to spring-load pin 110 and to lock blade 20 in position.

Thus, with the above construction, the blade 20 is first attached at each of its ends between a blade holder and clamp assembly. For this operation a suitable blade mounting fixture or jig can be utilized to insure that the blade and the holder and clamp assemblies are correctly aligned. Thereafter, the hood 31 is pivoted upwardly, the blade lower end inserted down through the opening 38 and lock pins 110 retracted and then inserted through aligned openings in the ears and flange portion to lock the prepositioned blade in place.

The novel mechanism of the invention for adjusting the tension of a blade 20 mounted in arms 21 and 22 is illustrated in FIGS. 4, 12 and 14. As best seen in FIG. 4, each of the arms 21 and 22 extends beyond its pivotal mounting in the frame, and the rearward ends of the extensions are interconnected by a tension rod 120. The lower end of this rod 120 is pivotally connected at 121 to the extension of lower arm 22, and the upper end of the rod extends loosely through a bore 122 in arm 21 and is threaded to receive a knob assembly 123 which can be tightened to force the rearward ends of arms 21 and 22 together and thereby to increase the tension applied to the blade 20 by the forward ends of arms 21 and 22. A tension spring 125 interconnects the rearward ends of arms 21 and 22 to apply tension thereto continuously even when the knob assembly 123 is released.

Referring particularly to FIGS. 12 and 14, a lower rocker member 130, which includes a tooth 131 of inverted V-shaped, is mounted on top of the rearward end of the arm 22 by a bolt 132. The rod 120 passes through a hole in the rocker member 130 and through a mating hole in the upper rocker member 133, which has a groove 134 in its underside that fits loosely over the tooth 131. A knob 135 is threaded on the upper end of the rod 120, and a spacer sleeve 136 is received between the knob 135 and the upper rocker member 133. The lower end of sleeve 136 is counterbored to receive a compression spring 137 which will maintain some tension between the sleeve 136 and the rocker member 133 when the knob 135 is backed off.

It will be seen that with this construction, when knob 135 is threaded downwardly on the tension rod 120, it will apply compression through the sleeve 136 onto the pair of rocker members 130 and 133 and thereby tend to force the rearward ends of the arms 21 and 22 closer together and correspondingly to draw the forward ends of these arms away from each other in order to apply tension to the blade 20 mounted therebetween. It will be apparent that any change in the angular relation of the rearward ends of arms 21 and 22 is compensated for by relative rocking movement of rocker members 130 and 133.

Audible means are provided for measuring the tension adjusting action of the knob 135. The top of this knob is suitably recessed to receive a clocker wheel 140 threaded on the top of the tension rod 120 and locked thereto by a set screw 141. The circumferential surface of the clocker 140 is provided with axially extending grooves 142 proportioned to receive a detent ball 145 carried in a radially extending groove in the knob 135 and held therein by a compression spring 146 and set screw 147. Thus as the knob 135 is rotated to increase or decrease the tension applied to the tension rod 120, these movements will be reflected in audible clicks as the ball 145 moves from one groove 142 to the next.

Provision is made for holding each workpiece W against the upper surface of the worktable 35 during a sawing operation thereon. Referring to FIGS. 1, 3 and 13, a fixture 150 is secured to the lower end of a rod 151 which depends from the forward end of the upper arm cover 30 and may be fixed in a desired vertical position, in accordance with the thickness of the workpiece, by a lock knob 152 having a shank threaded into the side of the arm cover 30.

A hold-down spring 154 has a slotted foot which engages the top of the workpiece and straddles the saw blade 20, as illustrated in FIGS. 1 and 13. This part 154 also includes a bracket portion 155 at the back thereof having an arcuate slot 156 therethrough by which it is mounted by a cap screw 157 (FIG. 1) on the back of fixture 150 for adjustment to match the angular adjustment of the worktable 35. The fixture 150 also supports a blade guide rod 160 having a V-groove in its forward end to receive and support the saw blade 20 from the back. The rearward end of the guide 160 is secured in the fixture 1560 by a set screw 161.

Another feature of the invention is the provision of novel means for removing sawdust from the workpiece as it is being cut by a blade 20. Referring to FIGS. 1, 2, 10, 11 and 13, an air pump indicated generally at 165 comprises a cylinder 166 mounted in the base 10 and a complementary piston assembly 167 depending from a pivotal mounting 168 on the lower blade-carrying arm 22.

A length of flexible tubing 170 leads from the bottom end of cylinder 166 to the rearward end of the base 10, and as shown in FIG. 10, the tubing 170 is supported by a clip portion 171 of the gear case cover 17. The tubing 170 passes upward from base 10 through the frame 25 and upper arm cover 30 to the front of the saw where it connects to the inlet end of a piece of non-flexible tubing 172 which is clamped at 173 to the fixture 150. The forward portion 175 of this non-flexible tubing is of generally inverted U-shaped which terminates in an open end just above the forward end of the hold-down spring 154.

Thus on each upward movement of the lower arm 22, air will be drawn into the cylinder 166, and on each downward stroke of arm 22, air will be forced from the cylinder through the tubing 170 to the tubing member 175 and discharged from its lower end as a puff capable of blowing away the sawdust accumulated during each complete cycle of the blade 20. It will also be seen that with the nonflexible tubing member 175 positioned immediately in front of the blade 20, it will act as a guard minimizing the possibility of accidental contact by the hands of the operator with the moving blade 20.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A reciprocating saw comprising:
   (a) frame means including a base and an upper portion overhanging said base;
   (b) upper and lower arm members extending above and below said frame means and mounted on said frame means for oscillating movement with respect to said base,
   (c) drive means for causing oscillating movement of said arm members,
   (d) a saw blade attached to said arm members for oscillating movement therewith,
   (e) air pump means mounted on said frame means,
   (f) guard means for said saw blade mounted on said frame means,
   (g) said guard means including a guard tube of non-flexible material supported on said frame means forward of said saw blade and extending substantially the full length of the portion of said saw blade above said base,
   (h) said guard tube having an open end positioned above and directed toward said base,
   (i) tubing connecting an opposite end of said guard tube to an output side of said pump means, and
   (j) means operated by said drive means for causing said pump means to deliver a stream of air to said tubing for discharge from said open end of said guard tube.

2. A reciprocating saw as defined in claim 1 further comprising a workpiece-supporting table mounted on said base, hold-down means for holding a workpiece on said table, a fixture supporting said hold-down means, means mounting said fixture on said upper portion of said frame means and including means for effecting adjustment of said fixture toward and away from said table in accordance with the thickness of a workpiece on said table, and means mounting said guard tube on said fixture with said open end of said guard tube adjacent said hold-down means.

3. A reciprocating saw as defined in claim 2 wherein said guard tube includes a major portion of inverted U-shape providing two vertically extending legs with said open end on one of said legs, said guard tube including a portion extending rearwardly from the lower end of the other said leg, means securing said rearwardly extending portion to said fixture to support said guard tube forwardly of and with said legs on opposite sides of said saw blade, and said rearwardly extending portion terminating in said opposite end of said guard tube with said tubing connected thereto.

4. In a power saw which comprises frame means including a base and an upper portion spaced above and overhanging said base, a workpiece-supporting table mounted on said base and including an opening for receiving a saw blade therethrough, a saw blade mounted for operating movement on said base with a portion thereof extending through said opening, means on said base for driving said saw, hold-down means for holding a workpiece on said table, a fixture supporting said hold-down means, and means supporting said fixture on said upper portion of said frame means with said hold-down means above said opening, said supporting means including means for effecting adjustment of said fixture toward and away from said table in accordance with the thickness of a workpiece on said table, the improvement comprising:
(a) a guard tube of inverted U-shape providing two vertically extending substantially straight legs connected at the upper ends thereof,
(b) one of said legs having the lower end thereof open,
(c) means securing the lower end of the other said leg to said fixture in a position wherein said guard tube is supported forwardly of and with said legs on opposite sides of said saw blade, and
(d) air pump means operated by said saw blade driving means and having an output side connected to said secured end of said guard tube leg for delivering a stream of air to said guard tube for discharge from said open end of said guard tube leg.

5. The combination defined in claim 4 wherein said saw blade travels vertically between said upper portion of said frame means and said table, and said guard tube is proportioned to extend from said fixture to said upper portion of said frame means to guard any portion of said saw blade traveling between said fixture and said upper portion of said frame member.

6. The combination defined in claim 5 wherein said saw blade is driven to reciprocate vertically in the space between said table and said upper portion of said frame means.

7. In a power saw which comprises frame means including a base and an upper portion spaced above and overhanging said base, a workpiece-supporting table mounted on said base and including an opening for receiving a saw blade therethrough, a saw blade mounted for vertical operating movement on said base with a portion thereof extending through said opening for preparation in the space between said table and said upper portion of said frame means, and means on said base for driving said saw, the improvement comprising:
(a) a guard tube of non-flexible material including a vertically extending substantially straight leg having the lower end thereof open,
(b) means supporting said guard tube on said upper portion of said frame means in a position wherein said guard tube is located in said space forwardly of said saw blade,
(c) said supporting means including means for effecting adjustment of said guard tube toward and away from said table in accordance with the thickness of a workpiece on said table,
(d) said guard tube leg being proportioned to extend from said table to said upper portion of said frame means to guard any portion of said saw blade traveling between said table and said upper portion of said frame means, and
(e) air pump means operated by said saw blade driving means and having an output side connected to said guard tube for delivering a stream of air to said guard tube for discharge from said open end thereof.

8. The combination defined in claim 7 wherein said guard tube is of inverted U-shape providing two outwardly extending substantially straight legs connected at the upper ends thereof, and wherein said supporting means supports said guard tube with said legs forwardly and on both sides of said saw blade.

* * * * *

UNITED STATES PATENT AND TRADEMARK OFFICE
CERTIFICATE OF CORRECTION

PATENT NO. : 5,065,652

DATED : November 19, 1991

INVENTOR(S) : John G. Legler

It is certified that error appears in the above-identified patent and that said Letters Patent is hereby corrected as shown below:

Column 8, line 9, "member" should read --means--,
line 21, "preparation" should read-- operation--.

Signed and Sealed this

Twenty-third Day of March, 1993

Attest:

STEPHEN G. KUNIN

Attesting Officer        Acting Commissioner of Patents and Trademarks

UNITED STATES PATENT AND TRADEMARK OFFICE
CERTIFICATE OF CORRECTION

PATENT NO. : 5,065,652
DATED : November 19, 1991
INVENTOR(S) : John G. Legler

It is certified that error appears in the above-identified patent and that said Letters Patent is hereby corrected as shown below:

On title page, item [75]

Robert L. Bartlett and David D. Flora should be deleted.

Item [60] "Related U.S. Application Data"

"abandoned" should be deleted and the following inserted: --now U.S. Patent No. 5,058,476, issued Oct. 22, 1991--.

Item [56] "Foreign Patent Documents"

"Canada 7284" should be inserted.

Column 1, line 5, "abandoned" should be deleted and the following inserted: --U.S. Patent No. 5,058,476, issued Oct. 22, 1991--.

Column 8, line 9, "member" should be --means--; line 21, "preparation" should be --operation--.

Signed and Sealed this

Sixteenth Day of November, 1993

Attest:

BRUCE LEHMAN

Attesting Officer

Commissioner of Patents and Trademarks